United States Patent [19]
Hung

[11] Patent Number: 5,904,325
[45] Date of Patent: May 18, 1999

[54] CLAMPING DEVICE FOR PIPES AND THE LIKE

[76] Inventor: Mao Sung Hung, No. 5, Sec. 3, Chang Chao Road, Ho Mei Town, Chang Hua Hsien, Taiwan

[21] Appl. No.: 08/931,191

[22] Filed: Sep. 16, 1997

[51] Int. Cl.⁶ .................................................. F16L 3/12
[52] U.S. Cl. .................... 248/74.4; 248/74.1; 248/73; 248/222.13; 403/409.1; 411/54; 24/702
[58] Field of Search .......................... 248/74.1, 71, 74.4, 248/73, 74.5, 220.22, 224.51, 223.41, 231.31, 221.11, 222.112, 22.13; 24/459, 702, 669, 625; 403/374.1, 374.4, 409.1, 367; 411/54, 45, 48

[56] References Cited

U.S. PATENT DOCUMENTS

| | | | |
|---|---|---|---|
| 990,460 | 4/1911 | Skelton | 411/54 X |
| 1,787,734 | 1/1931 | Rowling | 248/73 |
| 3,760,811 | 9/1973 | Andrew | 24/459 X |
| 3,807,675 | 4/1974 | Seckerson et al. | 248/73 |
| 4,118,838 | 10/1978 | Schiefer et al. | 24/459 X |
| 4,662,590 | 5/1987 | Hungerford, Jr. | 248/73 X |
| 4,688,961 | 8/1987 | Shioda et al. | 24/669 X |
| 4,769,876 | 9/1988 | Platt | 24/459 |
| 4,830,536 | 5/1989 | Birch et al. | 411/54 X |
| 4,892,435 | 1/1990 | Anderson | 403/409.1 X |
| 5,332,183 | 7/1994 | Kagayama | 248/223.41 X |
| 5,380,326 | 1/1995 | Lin | 403/409.1 X |
| 5,601,262 | 2/1997 | Wright | 248/74.1 X |

FOREIGN PATENT DOCUMENTS

| | | | |
|---|---|---|---|
| 812529 | 5/1937 | France | 248/74.4 |
| 1189026 | 9/1959 | France | 248/73 |
| 1543430 | 10/1968 | France | 248/74.4 |
| 1562272 | 4/1969 | France | 248/74.4 |

*Primary Examiner*—Derek J. Berger
*Assistant Examiner*—Stephen S. Wentsler

[57] ABSTRACT

A device for clamping a pipe includes a base part having a channel formed by two grooves and two ribs and having a coarse surface. A cap part includes a latch for engaging with the channel and having two flanges for engaging with the grooves and having a coarse surface for engaging with the coarse surface of the base part and for solidly securing the latch and the cap part to the base part. The base part includes a wedge extended in the channel. The latch includes a notch for engaging with the wedge and for solidly securing the latch to the base part.

2 Claims, 4 Drawing Sheets

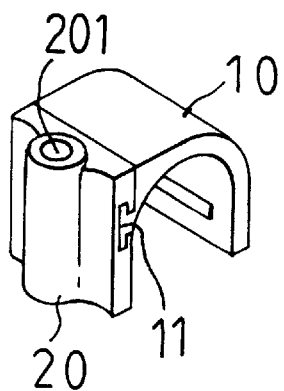
FIG.1
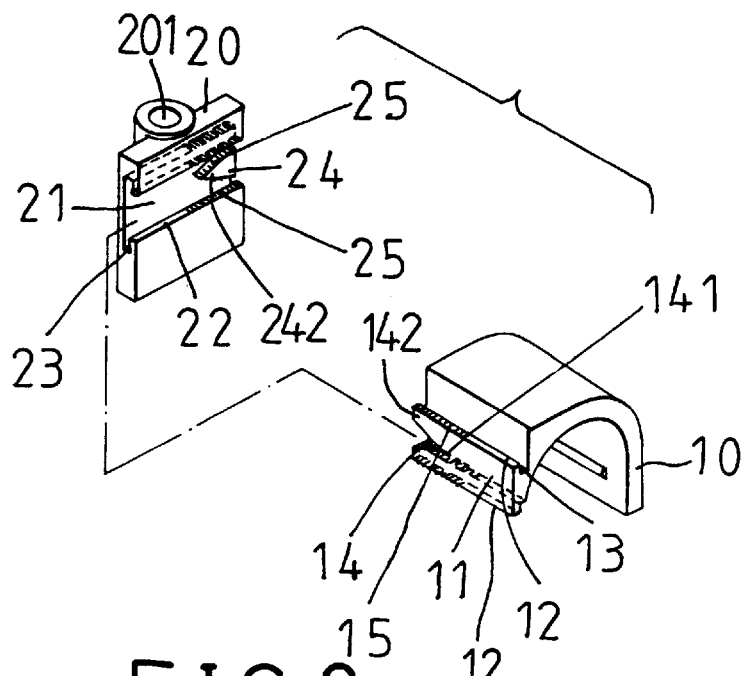
FIG.2
FIG. 3A
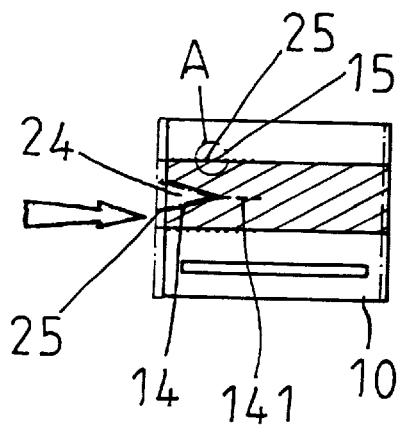
FIG.3
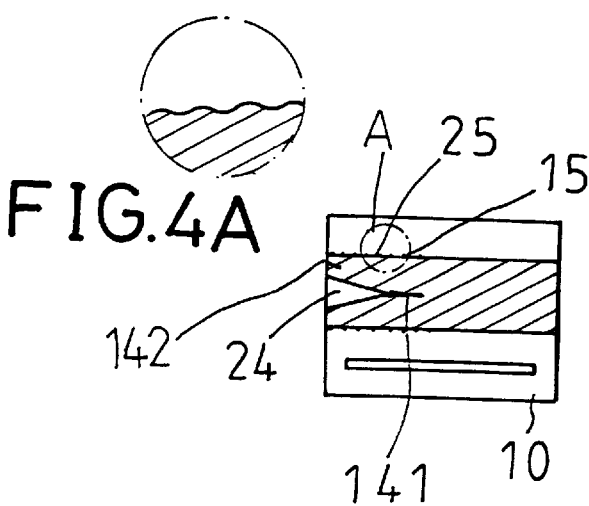
FIG.4A
FIG.4

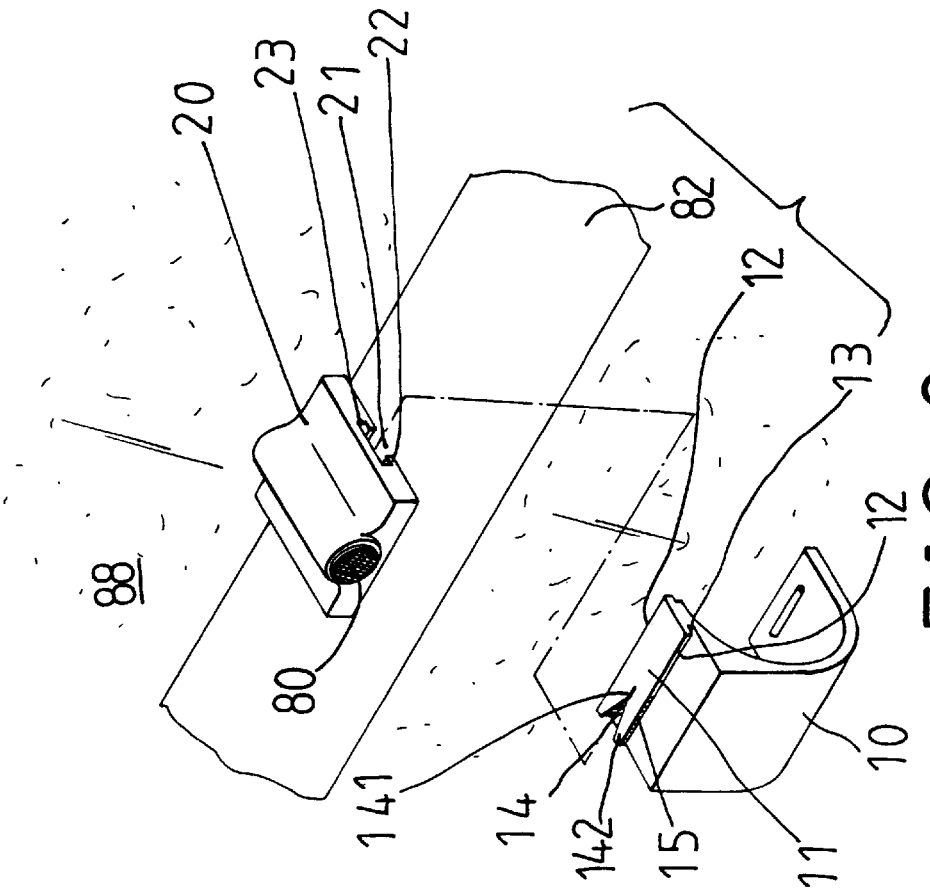
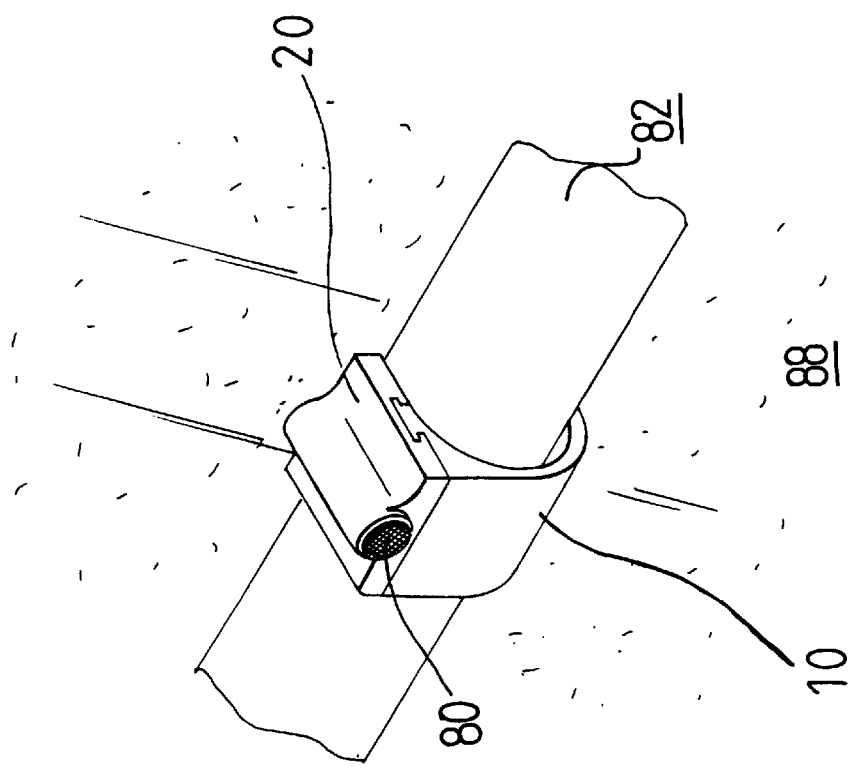
FIG. 6
FIG. 5

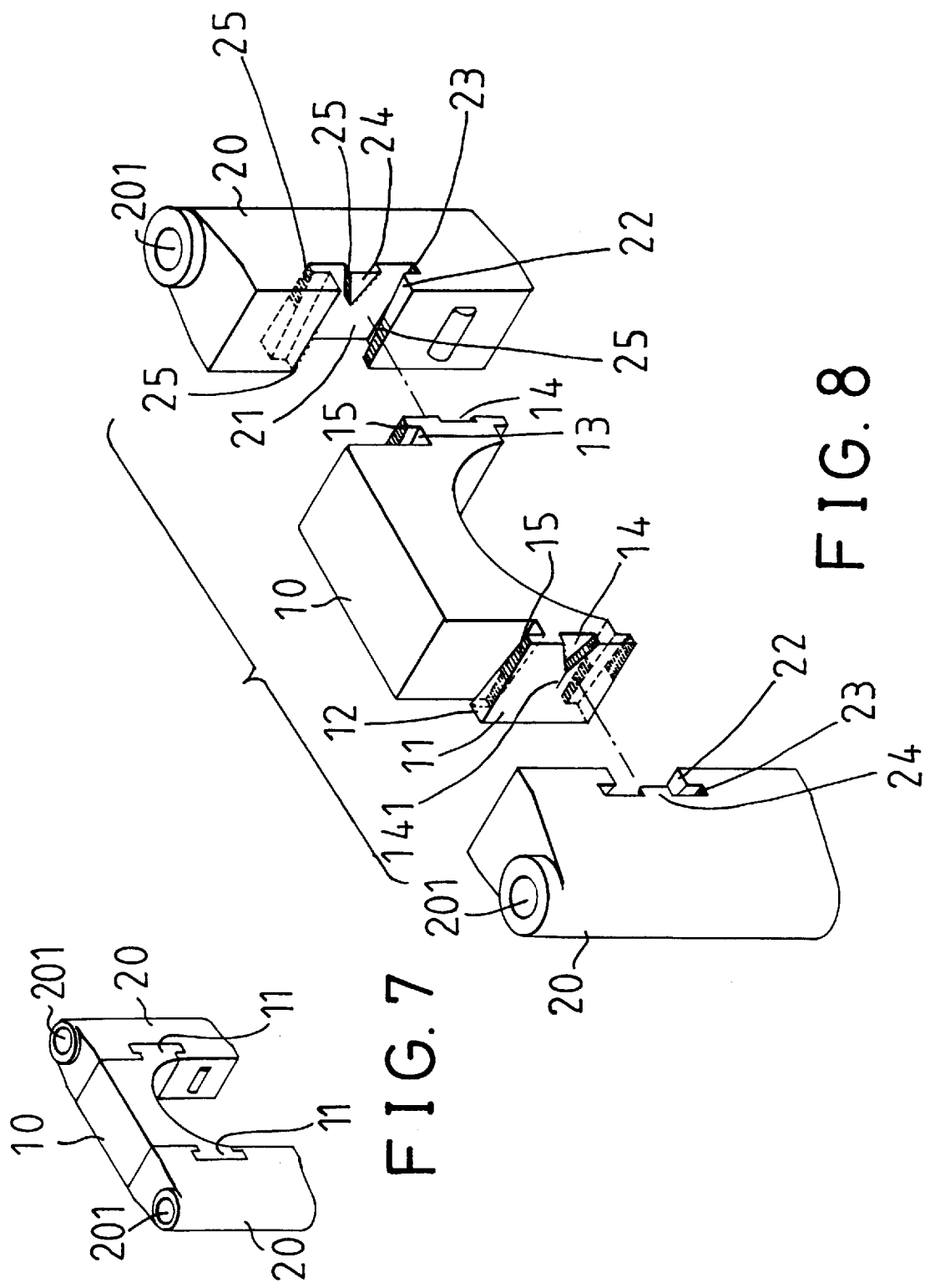

CLAMPING DEVICE FOR PIPES AND THE LIKE

BACKGROUND OF THE INVENTION

1. Field of the Invention

The present invention relates to a clamping device, and more particularly to a clamping device for pipes and the like.

2. Description of the Prior Art

One typical clamping device for pipes is disclosed in UK Patent No. 1350571 to Swallow, and comprises a seat part that may be firstly secured to the supporting surface and comprises a cap part that may be secured to the seat part for clamping a pipe. However, once the cap part is secured to the seat part, no securing devices or mechanisms may be provided for solidly securing the cap part to the seat part and for preventing the cap part from disengaging from the seat part, such that the cap part may be easily disengaged from the seat part. The cap part may also be easily forced away from the seat part by the pipe engaged between the seat part and the cap part, because the two sides of the base part may be easily forced outward and away from each other by the cap part.

The present invention has arisen to mitigate and/or obviate the afore-described disadvantages of the conventional clamping devices for pipes.

SUMMARY OF THE INVENTION

The primary objective of the present invention is to provide a clamping device which includes a cap part that may be solidly secured to the seat part without being easily disengaged from the seat part.

In accordance with one aspect of the invention, there is provided a clamping device for clamping a pipe and the like to a supporting surface, the clamping device comprises at least one base part including a hole for engaging with a fastener and for securing to the supporting surface, the base part including a channel having two grooves defined by a pair of ribs, the base part including a coarse surface formed in the channel, and at least one cap part including a latch for engaging with the channel of the base part, the latch including a pair of flanges for engaging with the grooves of the channel and including a coarse surface for engaging with the coarse surface of the base part and for solidly securing the latch and the cap part to the base part.

The channel includes a first end and a second end, the base part includes a wedge extended in the first end of the channel, the latch includes a notch formed in one end for engaging with the wedge and for further solidly securing the latch to the base part.

The notch is triangular having a tip portion extending toward the second end of the latch, the latch includes a slit extending from the notch toward the second end of the latch and includes two branches defined by the notch, the slit is provided for allowing the branches of the latch to be forced away from each other to engage with the base part and for further solidly securing the latch to the base part.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a clamping device in accordance with the present invention;

FIG. 2 is an exploded view of the clamping device;

FIGS. 3 and 4 are schematic views illustrating the operation of the clamping device;

FIGS. 3A and 4A are enlarged partial views of the areas indicated by "A" of FIGS. 3 and 4 respectively;

FIGS. 5 and 6 are perspective views illustrating the operation the clamping device;

FIG. 7 is a perspective view showing another application of the clamping device;

FIG. 8 is an exploded view of the clamping device as shown in FIG. 7; and

DETAILED DESCRIPTION OF THE PREFERRED EMBODIMENT

Figure 9:
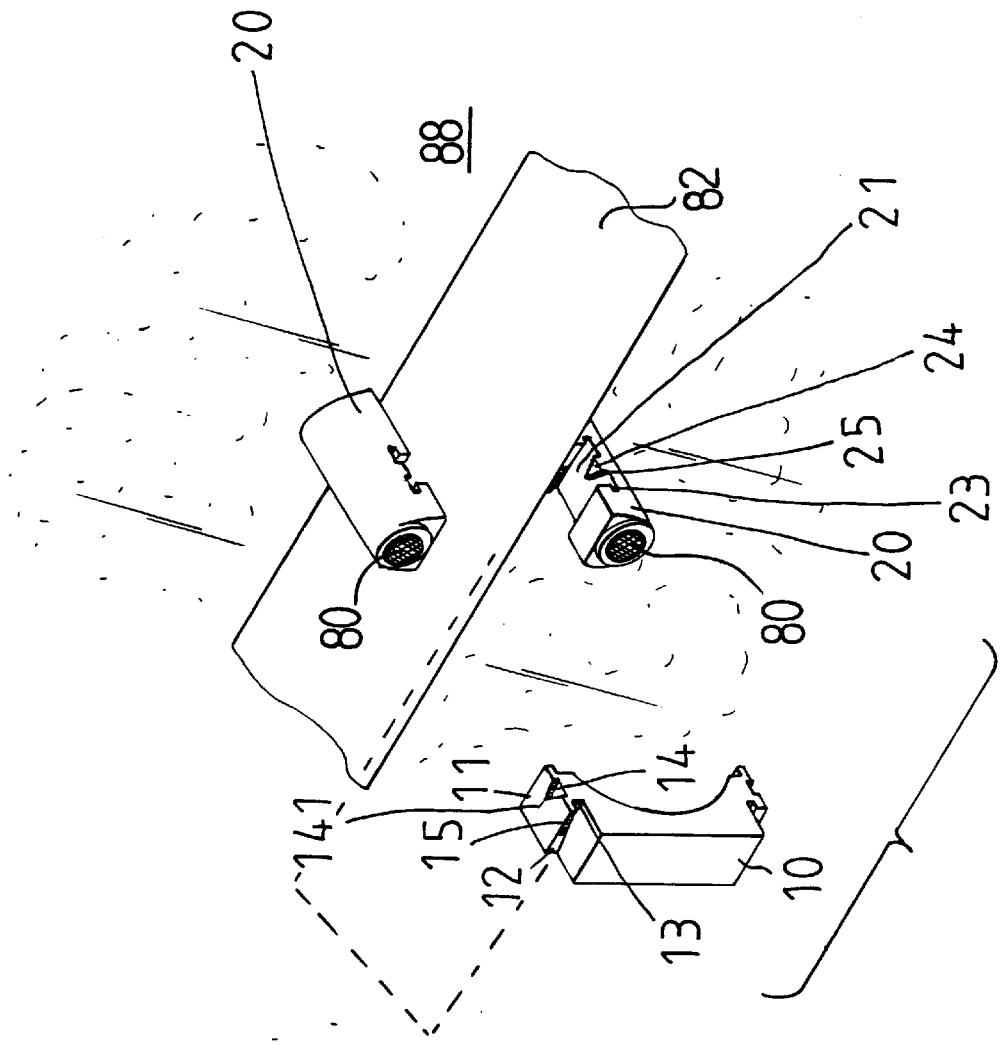
FIGS. 9 and 10 are perspective views illustrating the operation of the clamping device as shown in FIGS. 7 and 8.

Referring to the drawings, and initially to FIGS. 1 and 2, a clamping device in accordance with the present invention comprises a base part 20 including a hole 201 for engaging with a fastener 80 (FIGS. 5, 6) and for allowing the fastener 80 to secure the base part 20 to the supporting surface 88 (FIGS. 5, 6). The base part 20 includes a channel 21 extended perpendicular to the hole 201. The channel 21 includes an upper and a lower grooves 23 defined by a pair of ribs 22. The ribs 22 each includes a coarse or wave shaped surface or a surface formed by a number of teeth 25, and the grooves 23 are each defined by a coarse surface 25 (FIGS. 3, 4). A wedge 24 is formed on the base part 20 and extended in one end of the channel 21 and includes a tip 242 directing toward the other end of the channel 21. The wedge 24 also includes a coarse or wave shaped surface 25.

A cap part 10 includes a lateral portion having a latch 11 for engaging into the channel 21 of the base part 20. The latch 11 includes an upper and a lower flanges 12 for engaging with the grooves 23 of the base part 20. The flanges 12 each includes a coarse or wave shaped surface 15 for engaging with the corresponding surface 25 of the base part 20 and for allowing the cap part 10 to be solidly secured to the base part 20. The upper flange 12 is defined by a slot 13 which is formed between the upper flange 12 and the cap part 10 for engaging with the upper rib 22 of the base part 20. The slot 13 is preferably defined by a coarse surface 15 for engaging with the corresponding coarse surface 25 of the base part 20. The latch 11 includes one end having a triangular notch 14 for engaging with the wedge 24 and for allowing the cap part 10 to be further solidly secured to the base part 20. Two branches 142 (FIG. 2) may thus be formed and defined by the notch 14. The surface for defining the notch 14 also includes a coarse or wave shaped surface for engaging with the corresponding surface 25 of the wedge 24. The latch 11 includes a slit 141 extended from the tip portion of the notch 14 in a direction toward the other end of the latch 11 for allowing the wedge 24 to force the branches 142 away from each other to engage with the seat part 20 such that the cap part 10 may be solidly secured to the base part 20 and may be prevented from being easily disengaged from the base part 20 (FIGS. 3 and 4). The pipes 82 or conduits or electric wires or the like may thus be solidly secured in place by the clamping device.

In operation, as shown in FIGS. 3–6, the base part 20 may first be secured to the supporting surface 88 by a fastener 80 before the cap part 10 and the pipe 82 are secured to the base part 20, such that the pipe 82 may be prevented from being damaged. The engaging surfaces 15, 25 of the cap part 10 and the base part 20 allow the cap part 10 to be easily and solidly secured to the base part 20. In addition, the wedge 24 may force the branches 142 to engage with the base part 20 for further solidly securing the cap part 10 to the base part 20. It is to be noted that the two flanges 12 are solidly engaged in the grooves 23 such that the latch 11 may be prevented from being disengaged from the channel 21.

Figure 10:
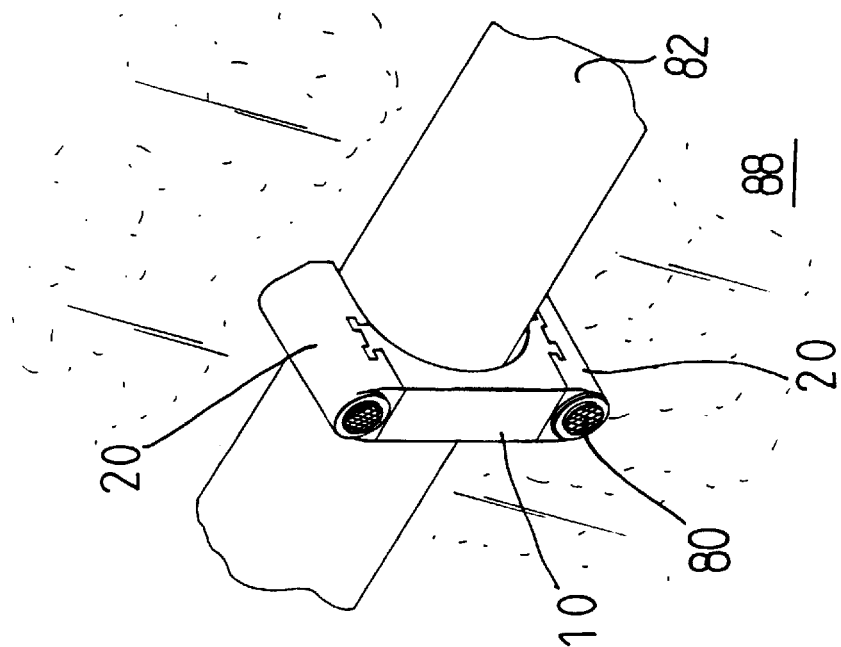

Referring next to FIGS. 7–10, two base parts 20 may first be secured to the supporting surface 88 by the fasteners 80 and may each include a wedge 24 formed in the channel 21. The cap part 10 may include two latches 11 for engaging with the channels 21 for allowing the cap part 10 to be solidly secured to the base parts 20 and for allowing the cap part 10 to solidly secure the pipe 82 to the supporting surface 88.

Accordingly, the clamping device in accordance with the present invention includes a cap part that may be solidly secured to the seat part without being easily disengaged from the seat part.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A clamping device for clamping a pipe and the like to a supporting surface, said clamping device comprising:

at least one base part including a hole for engaging with a fastener and for allowing the fastener to secure said at least one base part to the supporting surface, said at least one base part including a channel having two grooves defined by a pair of ribs, said channel including a first end and a second end, said at least one base part including a coarse surface formed in said channel, and said at least one base part including a wedge extended in said first end of said channel, and at least one cap part including a latch for engaging with said channel of said at least one base part, said latch including pair of flanges for engaging with said grooves of said channel, and said latch including a coarse surface for engaging with said coarse surface of said at least one base part and for solidly securing said latch and said at least one cap part to said at least one base part, said latch including a first end and a second end and including a notch formed in said first end of said latch for engaging with said wedge and for further solidly securing said latch to said at least one base part, said notch being triangular having a tip portion extending in a direction toward said second end of said latch, said latch including a slit extending from said tip portion of said notch toward said second end of said latch and said latch including two branches defined by said notch, said slit being provided for allowing said branches of said latch to be forced away from each other to engage with said at least one base part and for further solidly securing said latch to said at least one base part.

2. A clamping device for clamping a pipe and the like to a supporting surface, said clamping device comprising:

at least one base part including a hole for engaging with a fastener and for allowing the fastener to secure said at least one base part to the supporting surface, said at least one base part including a channel having two grooves defined by a pair of ribs, said channel including a first end and a second end, said at least one base part including a wedge extended in said first end of said channel, and at least one cap part including a latch for engaging with said channel of said at least one base part, said latch including a pair of flanges for engaging with said grooves of said channel, and said latch including a first end and a second end and including a notch formed in said first end of said latch for engaging with said wedge and for solidly securing said latch to said at least one base part, said notch being triangular having a tip portion extending in a direction toward said second end of said latch, said latch including a slit extending from said tip portion of said notch toward said second end of said latch and said latch including two branches defined by said notch, said slit being provided for allowing said branches of said latch to be forced away from each other to engage with said at least one base part and for further solidly securing said latch to said at least one base part.

\* \* \* \* \*